(12) United States Patent
Huang et al.

(10) Patent No.: US 10,014,723 B2
(45) Date of Patent: Jul. 3, 2018

(54) POWER MANAGEMENT UNIT AND WIRELESS POWER SYSTEM USING THE SAME

(71) Applicant: RICHTEK TECHNOLOGY CORP, Hsinchu (TW)

(72) Inventors: Wei-Jen Huang, Hsinchu (TW); Shui-Mu Lin, Hsinchu (TW)

(73) Assignee: RICHTEK TECHNOLOGY CORP, Hsinchu (TW)

( * ) Notice: Subject to any disclaimer, the term of this patent is extended or adjusted under 35 U.S.C. 154(b) by 1048 days.

(21) Appl. No.: 14/258,708

(22) Filed: Apr. 22, 2014

(65) Prior Publication Data

US 2015/0137611 A1 May 21, 2015

(30) Foreign Application Priority Data

Nov. 18, 2013 (TW) .............................. 102141886 A (51) Int. Cl.
| | |
|---|---|
| H01F 27/42 | (2006.01) |
| H01F 37/00 | (2006.01) |
| H01F 38/00 | (2006.01) |
| H02J 50/12 | (2016.01) |
| H02J 5/00 | (2016.01) |
| H02J 7/02 | (2016.01) |
| H02M 7/217 | (2006.01) |

(52) U.S. Cl.
CPC .............. *H02J 50/12* (2016.02); *H02J 5/005* (2013.01); *H02J 7/025* (2013.01); *H02M 7/217* (2013.01)

(58) Field of Classification Search
CPC .. H02J 5/005; H02J 7/025; H02J 7/045; H02J 50/12; H02M 7/217
USPC ......................................................... 307/104
See application file for complete search history.

(56) References Cited

U.S. PATENT DOCUMENTS

| | | | |
|---|---|---|---|
| 2011/0241437 A1* | 10/2011 | Kanno .................... | H01F 38/14 307/104 |
| 2012/0050931 A1* | 3/2012 | Terry ....................... | H02H 9/04 361/91.5 |
| 2013/0023943 A1* | 1/2013 | Parramon ............. | A61N 1/3787 607/2 |

(Continued)

FOREIGN PATENT DOCUMENTS

| | | |
|---|---|---|
| KR | 20130047114 | 5/2013 |
| KR | 20130095906 | 8/2013 |

(Continued)

*Primary Examiner* — Richard Tan
(74) *Attorney, Agent, or Firm* — Chun-Ming Shih (57) ABSTRACT

A power management unit, adapted to a wireless power system, includes: a rectifier, converts an AC power received by an input port thereof to a direct-current (DC) voltage outputted by a rectifying output terminal thereof; a first switch, wherein a first protecting capacitor is coupled between one terminal of the input port and a channel thereof; a second switch, wherein a second protecting capacitor is coupled between the other terminal of the input port and a channel thereof; a reference voltage terminal, for providing a reference voltage; and, a comparator, including two input terminals coupled to the rectifying output terminal and the reference voltage terminal respectively, and including an output terminal coupled to both the control terminals of the first switch and the second switch.

10 Claims, 5 Drawing Sheets

(56) References Cited

U.S. PATENT DOCUMENTS

| | | | |
|---|---|---|---|
| 2013/0099585 A1* | 4/2013 | Von Novak | H01F 38/14 |
| | | | 307/104 |
| 2014/0361639 A1* | 12/2014 | Ichikawa | H02H 9/04 |
| | | | 307/149 |
| 2015/0008755 A1* | 1/2015 | Sone | H02J 7/025 |
| | | | 307/104 |

FOREIGN PATENT DOCUMENTS

| | | |
|---|---|---|
| KR | 20130101246 | 9/2013 |
| TW | 201246742 A1 | 11/2012 |
| WO | WO2012099069 A1 | 7/2012 |

* cited by examiner

POWER MANAGEMENT UNIT AND WIRELESS POWER SYSTEM USING THE SAME

CROSS-REFERENCES TO RELATED APPLICATIONS

This non-provisional application claims priority under 35 U.S.C. § 119(a) on Patent Application No. 102141886 filed in Taiwan, R.O.C. on 18 Nov. 2013, the entire contents of which are hereby incorporated herein by reference.

BACKGROUND

1. Technical Field

This present invention relates to a power management unit and a wireless power system adopting the power management unit, more specifically, to a power management unit with over-voltage protection and a wireless power system adopting the power management unit.

2. Description of Related Art

Wireless power, also known as wireless energy transmission, is a technique which takes advantage of near-field coupling, for example inductive coupling, to transmit energy from a power supplying equipment to an electric device. For example in the application of wireless charging, an electronic device receives energy via wireless power for charging a battery and providing required power for operation. Since the energy transmission between the electronic device and the power supplying equipment is realized by inductive coupling without conducting wires, no conducting point is exposed on both the electronic device and the power supplying equipment. Therefore, the danger of electric shot by contacting can be avoided, and the un-exposed metal parts can be free from oxidation by water vapor or oxygen. Besides, the mechanical degradation and the possible danger caused by spark, both of which are caused by connecting and separating the electronic device and the power supplying equipment, can also be avoided.

The technical development on wireless power brings great contribution on the medical applications and consumer electronics. The wireless power technique makes medical implant device safer. Without conducting wires penetrating skin and other body tissues, patient can charge the medical implant device without harming body tissues and free from the risk of infection. The wireless power technique also brings great convenience on consumer electronics since devices can be charged merely by being placed in the vicinity of the wireless charger, and the wires are obsoleted. Besides, technically a wireless charger can charge many electronic devices at the same time which saves wires, adaptors and power outlets.

Figure 1:
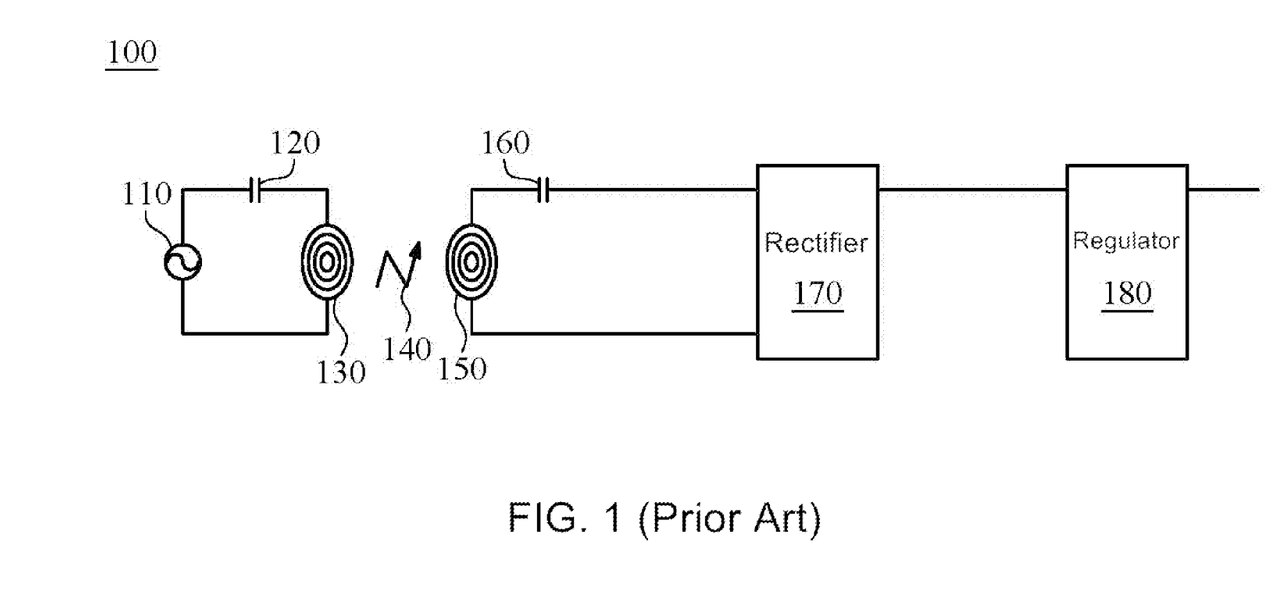
FIG. 1 is a schema of a wireless power system 100 of prior art.

FIG. 1 is a schema of a wireless power system 100 of prior art. The wireless power system 100 includes a wireless power transmitting end and a wireless power receiving end. The wireless power transmitting end includes a power supply 110, a supply coupling capacitor 120 and first windings 130. The wireless power receiving end includes second windings 150, input capacitor 160. The wireless power transmitting end transmits a wireless power 140 of alternating current (AC), and the wireless power receiving end receives the wireless power 140 by near-field coupling, for example (but not limited to) inductive coupling between first windings 130 and second windings 150, to generate an AC power into a rectifier 170. The rectifier 170 is adopted to rectify the received AC power into a direct-current (DC) voltage. The wireless power system 100 can further include a regulator 180 which receives the DC voltage from rectifier 170 and generates a stable output voltage to supply a load (not shown in FIG. 1). In the application of wireless charging, the regulator 180 generates a regulated output voltage or output current to charge a battery.

However, on the design of the rectifier, the converting efficiency of the rectifier 170 should be taken into consideration. As the result, a rated maximal voltage value is usually specified to the devices of the rectifier 170. If the input voltage of the rectifier 170 is higher than the rated maximal voltage value, the lifetime of the rectifier 170 will be decreased. In the worst case, the rectifier 170 is damaged directly. Nonetheless, with gradually prevailing of the wireless power technology, different wireless power standards of wireless power systems will be developed to apply to different application scenarios. Hence, it will possibly happen that a wireless power receiver with lower rated maximal voltage value is coupled to a wireless power transmitter with higher rated maximal voltage value, which causes a voltage higher than the rated maximal voltage value generated on the input port of the rectifier, and the lifetime of the wireless power receiver is decreased, or even the wireless power receiver is damaged. Therefore, there should be protection design on the wireless power receiver to prevent possible damage from the aforementioned cases.

SUMMARY

In view of above problems, the objective of the present invention is to provide a power management unit and a wireless power system adopting the power management unit, more specifically, to a power management unit with over-voltage protection and a wireless power system adopting the power management unit.

In one embodiment, a power management unit adapted to a wireless power system is disclosed. The wireless power system further includes second windings, an input capacitor, a first protecting capacitor and a second protecting capacitor. The second windings receive a wireless power of alternating-current (AC). The input capacitor is coupled between one terminal of the second windings and a power receiving terminal. The power management unit further includes a rectifier, a regulator, a first switch, a second switch, a reference voltage terminal, and a comparator.

The rectifier includes an input port and a rectifying output terminal. The two terminals of the input port are coupled to the power receiving terminal and the other terminal of the second windings respectively. The rectifier converts an AC power received by the input port to a direct-current (DC) voltage, and the rectifying output terminal outputs the DC voltage. The regulator is coupled to the rectifier and receives the DC voltage to either output a DC output voltage to a load or charge a battery with a CV (constant-voltage) mode or a CC (constant-current) mode.

The first protecting capacitor is coupled between the power receiving terminal and one terminal of the channel of the first switch. The other terminal of the channel of the first switch is coupled to a ground terminal. The second protecting capacitor is coupled between the other terminal of the second windings and one terminal of the channel of the second switch. The other terminal of the channel of the second switch is coupled to the ground terminal.

The reference voltage terminal provides a reference voltage. The comparator includes two comparing input terminals and a comparing output terminal. The two comparing input terminals are coupled to the rectifying output terminal and the reference voltage terminal respectively. The comparing output terminal is coupled to both the control terminal of the first switch and the control terminal of the second switch.

In another embodiment, a wireless power system, including the same circuit topology as that of the wireless power system disclosed in the embodiment of the power management unit, is disclosed.

The present invention is advantageous because the power management unit and the wireless power system adopting the power management unit can perform protection in the first place when an over-high wireless power is received. Therefore, it can prevent the power management unit from constantly receiving an over-high voltage causing the power management unit to be with a short lifetime or even being damaged directly.

BRIEF DESCRIPTION OF THE DRAWINGS

These and other objectives of the present invention will no doubt become obvious to those of ordinary skill in the art after reading the following detailed description of the preferred embodiments that is illustrated in the various figures and drawings, in which.

DETAILED DESCRIPTION OF THE EMBODIMENTS

In the description hereinafter, the term of "coupled" or "coupling" refers to any two objects directly or indirectly electrically connected to each other. Therefore, if it is described that "a first device is coupled to a second device," the meaning is that the first device is either directly electrically connected to the second device or indirectly electrically connected to the second device through other devices or connection means.

Figure 2:
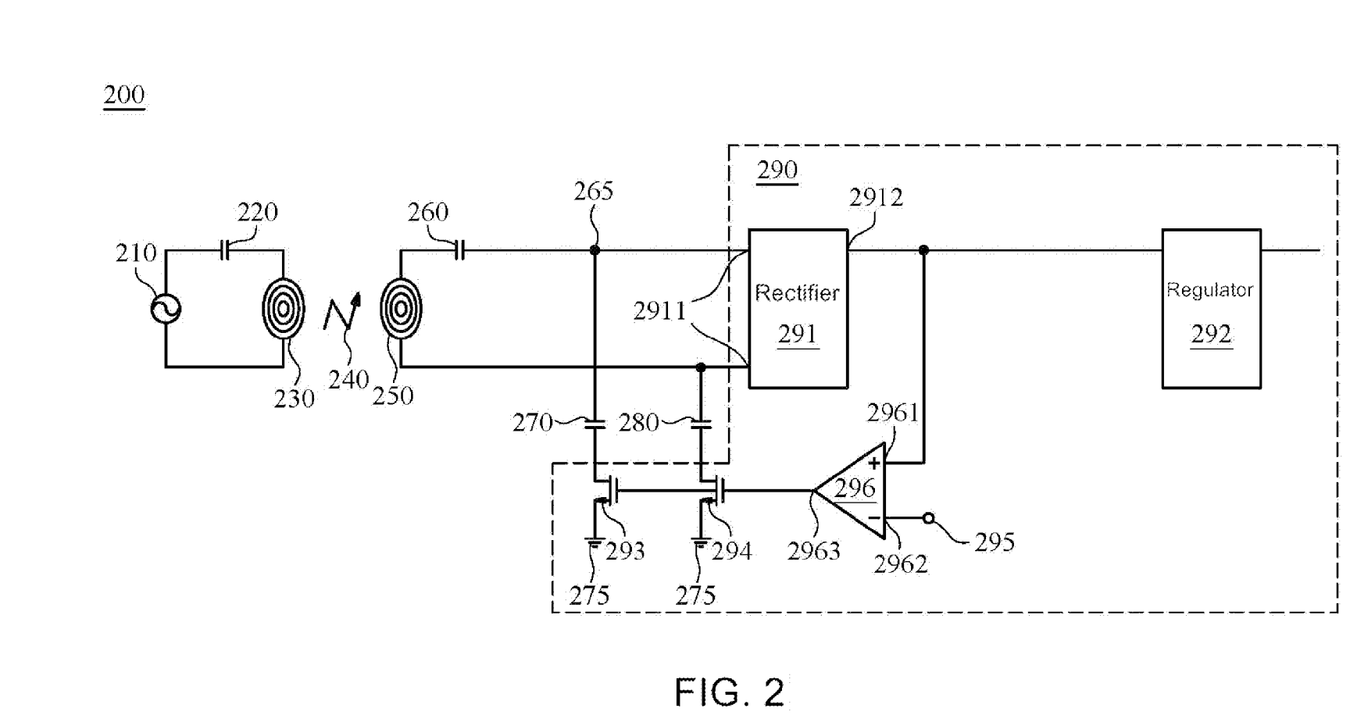
FIG. 2 is a schema showing a wireless power system of the first embodiment of the present invention.

FIG. 2 is a schema showing a wireless power system 200 of the first embodiment of the present invention. The wireless power system 200 includes second windings 250, an input capacitor 260, a first protecting capacitor 270, a second protecting capacitor 280 and a power management unit 290. The second windings 250 receive a wireless power 240 of alternating-current (AC). The input capacitor 260 is coupled between one terminal of the second windings 250 and a power receiving terminal 265. The power management unit 290 further includes a rectifier 291, a regulator 292, a first switch 293, a second switch 294, a reference voltage terminal 295, and a comparator 296.

The rectifier 291 includes an input port 2911 and a rectifying output terminal 2912. The two terminals of the input port 2911 are coupled to the power receiving terminal 265 and the other terminal of the second windings 250 respectively. The rectifier 291 converts an AC power received by the input port 2911 to a direct-current (DC) voltage, and the rectifying output terminal 2912 outputs the DC voltage. The regulator 292 is coupled to the rectifier 291 and receives the DC voltage to either output a DC output voltage to a load (not shown in FIG. 2) or charge a battery (not shown in FIG. 2) with a CV (constant-voltage) mode or a CC (constant-current) mode.

The first protecting capacitor 270 is coupled between said power receiving terminal 265 and one terminal of the channel of the first switch 293. The other terminal of the channel of the first switch 293 is coupled to a ground terminal 275. The second protecting capacitor 280 is coupled between the other terminal of the second windings 250 and one terminal of the channel of said second switch 294. The other terminal of the channel of the second switch 294 is coupled to the ground terminal 275.

The reference voltage terminal 295 provides a reference voltage. The comparator 296 includes two comparing input terminals 2961, 2962 and a comparing output terminal 2963. The two comparing input terminals 2961, 2962 are coupled to the rectifying output terminal 2912 and the reference voltage terminal 295 respectively. The comparing output terminal 2963 is coupled to both the control terminal of the first switch 293 and the control terminal of the second switch 294. The first switch 293 and the second switch 294 can be, but are not limited to, N-type field-effect transistors (FET's) or NPN-type bipolar junction transistors (BJT's). Note that a FET could be a metal-oxide-semiconductor field-effect transistor (MOSFET), a junction field-effect transistor (JFET), an insulated-gate bipolar transistor (IGBT), or any other semiconductor device with similar physical structures and functions of the above mentioned types of field-effect transistor devices. Furthermore, a control terminal of a FET means a gate terminal thereof, and a channel of a FET means a channel between a source terminal and a drain terminal thereof a control terminal of a BJT means a base terminal thereof, and a channel of a BJT means a channel between a collector terminal and an emitter terminal thereof.

Besides, the wireless power system 200 can further include a wireless power transmitter including a power supply 210, a supply-side coupling capacitor 220 and first windings 230. The wireless power transmitter generates the wireless power 240 and transmits the wireless power 240 through the first windings 230. That is, the power supply 210 generates energy coupled to the first windings 230 through the supply-side coupling capacitor 220, and the first windings 230 converts the energy to the wireless power 240 and emits the wireless power 240.

Moreover, with the advance of the semiconductor process technology, the power management unit 290 can be an integrated circuit (IC) manufactured by the semiconductor process. That is, the devices of the power management unit 290 are integrated on one or more than one IC chips by the semiconductor process. The IC chips are further packaged as a package and the circuits on the chips are electrically coupled to the application circuits outside the package through the pins on the package.

Furthermore, the proper capacitance value of the first protecting capacitor 270 and the second protecting capacitor 280 are hundreds of nano-Farad (nF), such as 470 nF. Therefore, the first protecting capacitor 270 and the second protecting capacitor 280 are not suitable to be integrated into IC chips. As the results, the first protecting capacitor 270 and the second protecting capacitor 280 can be discrete electrolytic capacitors or ceramic capacitors, wherein the common electrolytic capacitors include aluminum electrolytic capacitors and tantalum electrolytic capacitors.

In more detail, when the wireless power system 200 is under normal operation, the voltage on the rectifying output terminal 2912 is lower than the reference voltage on the reference voltage terminal 295, and the voltage level outputted by the comparing output terminal 2963 of the comparator 296 controlling the channels of the first switch 293 and the second switch 294 to be cut-off. Consequently the first protecting capacitor 270 and the second protecting capacitor 280 is floating, and have no substantial influence on the operation of the rectifier 291. For example, when the comparing output terminal 2963 outputs a voltage level of 0 volts the same as the voltage level of the ground terminal 275, the channels of the first switch 293 and the second switch 294, which can be N-type FET's or NPN-type BJT's, are cut-off. Note that meanwhile, each of the floating first protecting capacitor 270 and the second floating protecting capacitor 280 is discharged through the intrinsic leakage path of a capacitor device. After a specific time, it is prone to be no electric charges existing on both electric plates of each of the first protecting capacitor 270 and the second protecting capacitor 280.

Nonetheless, when a wireless power system 200 of a lower power specification receives a wireless power transmitted by a wireless power transmitter of a higher power specification, there is possible an over-high voltage on the input port 2911 of the rectifier 291, which further causes an over-high voltage on the rectifying output terminal 2912 of the rectifier 291. When the voltage on the rectifying output terminal 2912 is higher than the reference voltage on the reference voltage terminal 295, the comparing output terminal 2963 outputs a voltage of voltage level higher than the threshold voltage value of the first switch 293 and the second switch 294 and controlling the channels of the first switch 293 and the second switch 294 conducting, which has at least the following two effects. First, the first protecting capacitor 270 is coupled to the ground terminal 275 through the first switch 293, and the second protecting capacitor 280 is coupled to the ground terminal 275 through the second switch 294, which effectively decreases the absolute voltages (relative to the ground terminal 275) of the two terminals of the input port 2911 and prevents the absolute voltages of the two terminals of the input port 2911 from high than the rated maximal voltage thereof. Second, the input port 2911 is shunt to an effectively large capacitor formed by the serial connection of the first protecting capacitor 270 and the second protecting capacitor 280, and is further serial connected to the input capacitor 260 and the second windings 250, which forms a complete current loop. Therefore, when a somewhat larger voltage exists on the second windings 250, the voltage on the input port 2911, that is the voltage difference of the two terminals of the input port 2911, can be prevented from higher than the rated maximal voltage by voltage dividing of the above-mentioned effectively large capacitor and relatively small input capacitor 260.

According to the above descriptions, it can be understood that the protection circuit formed by the first switch 293, the second switch 294, the reference voltage terminal 295, the comparator 296, the first protecting capacitor 270 and the second protecting capacitor 280 can prevent the power management unit 290 from constantly receiving an over-high voltage causing the power management unit 290 to be with a short lifetime or even being damaged directly.

Figure 3:
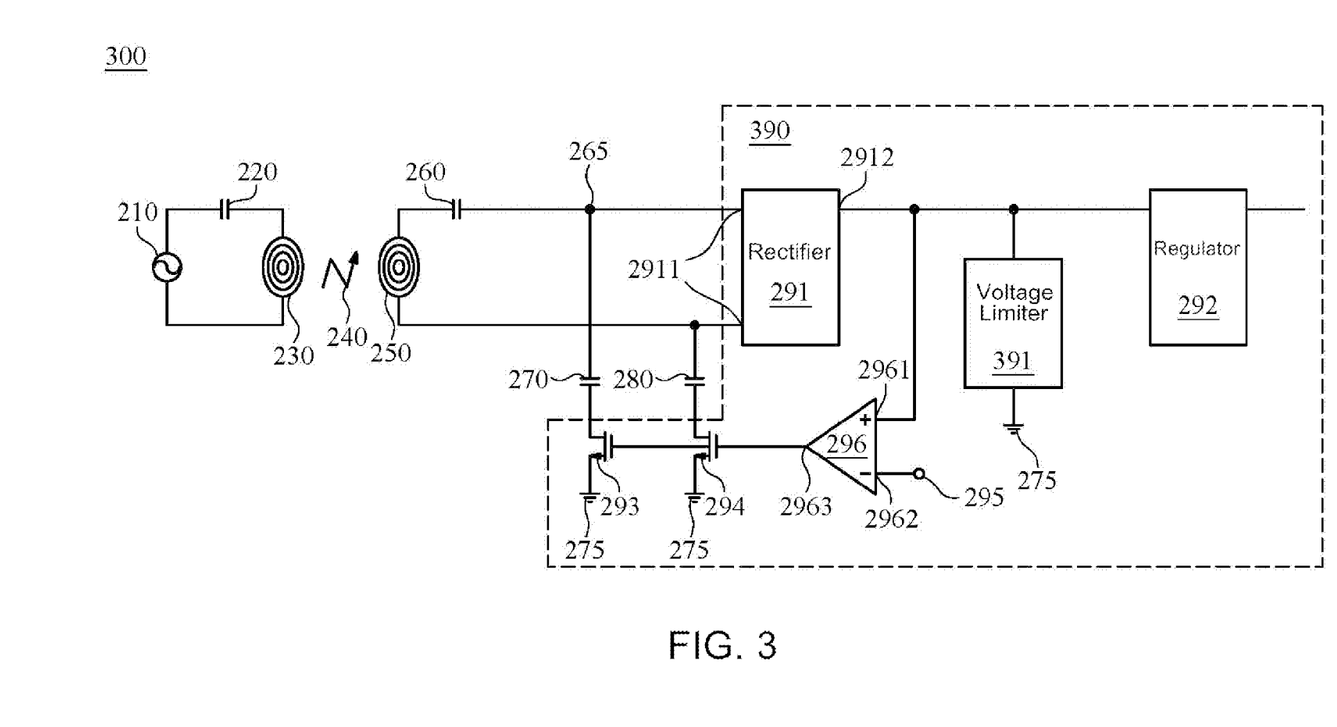
FIG. 3 is a schema showing a wireless power system of the second embodiment of the present invention.

FIG. 3 is a schema showing a wireless power system 300 of the second embodiment of the present invention. The function and the realization of each part of the wireless power system 300 can be referred to the description of the corresponding part of the wireless power system 200 disclosed in FIG. 2. The difference of the wireless power system 200 and 300 is that the power management unit 390 of the wireless power system 300 further includes a voltage limiter 391. The voltage limiter 391 includes a voltage-limiting current path coupled between the rectifying output terminal 2912 and the ground terminal 275. When the voltage of the rectifying output terminal 2912 is larger than a voltage threshold, the voltage-limiting current path is conducting, and when the voltage of the rectifying output terminal 2912 is smaller than the voltage threshold, the voltage-limiting current path is cut-off.

In more detail, the operation of the protection circuit of the wireless power system 200 disclosed in FIG. 2 is activated by an over-high voltage on the rectifying output terminal 2912 causing the comparator 296 outputting a voltage controlling the first switch 293 and the second switch 294 conducting. Subsequently, the voltage on the input port 2911 is pulled low by the first protecting capacitor 270 and the second protecting capacitor 280 and further lowers the originally over-high voltage on the rectifying output terminal 2912. However, since the response time is not short enough, the devices relating to the rectifying output terminal 2912 might have been damaged due to the over-high voltage before the over-high voltage is lowered. Therefore, by further including the voltage limiter 391 in the power management unit 390 of the wireless power system 300, the voltage on the rectifying output terminal 2912 is limited in the first place when the voltage on the rectifying output terminal 2912 is over-high, and the devices relating to the rectifying output terminal 2912 are thus protected. However, the voltage-limiting current path of the voltage limiter 391 is effective as a finite resistor with limited current conducting ability, hence, the following protection, which is provided by the first switch 293, the second switch 294, the first protecting capacitor 270 and the second protecting capacitor 280, is activated by the response of the comparator 296 to further protect the power management unit 390.

According to the above descriptions, it can be understood that the protection circuit formed by the voltage limiter 391, the first switch 293, the second switch 294, the reference voltage terminal 295, the comparator 296, the first protecting capacitor 270 and the second protecting capacitor 280 in the wireless power system 300 can prevent the voltage on the rectifying output terminal 2912 from over-high, and further prevent the power management unit 390 from constantly receiving an over-high voltage causing the power management unit 390 to be with a short lifetime or even being damaged directly.

Figure 4:
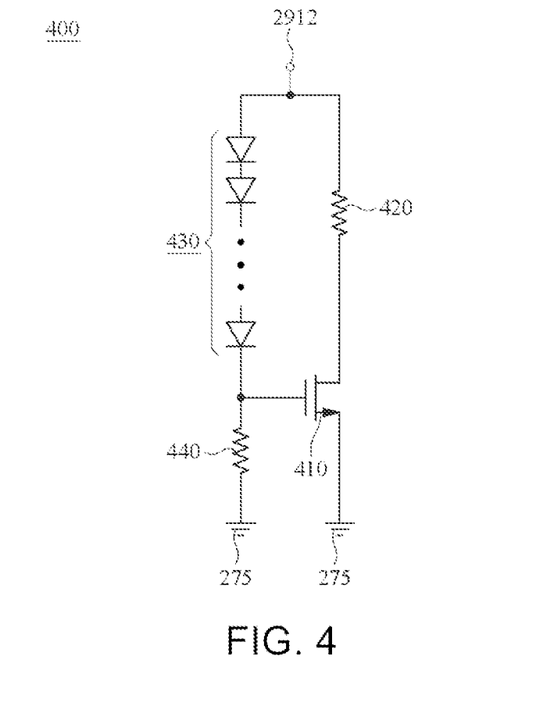
FIG. 4 is an embodiment of a voltage limiter of the present invention.

FIG. 4 is an embodiment of a voltage limiter of the present invention, which is the voltage limiter 400. The voltage limiter 400 includes a voltage-limiting switch 410, a current-limiting resistor 420, a diode serial-connecting circuit 430, and a control-terminal resistor 440.

One terminal of the channel of the voltage-limiting switch 410 is coupled to the ground terminal 275. The current-limiting resistor 420 is coupled between the rectifying output terminal 2912 and the other terminal of the channel of the voltage-limiting switch 410. The diode serial-connecting circuit 430 is formed by serially connecting a plurality of diodes which is coupled between the rectifying output terminal 2912 and the control terminal of the voltage-limiting switch 410. The control-terminal resistor 440 is coupled between the control terminal of the voltage-limiting switch 410 and the ground terminal 275. The voltage-limiting switch 410 can be, but is not limited to, an N-type FET or an NPN-type BJT.

In more detail, assume the diode serial-connecting circuit 430 is formed by serially connecting N diodes in the same direction, and the forward-biasing voltage of each diode is Vf. Therefore, when the voltage on the rectifying output terminal 2912 is larger than N*Vf, the diode serial-connecting circuit is conducting, and the voltage on the control terminal of the voltage-limiting switch 410 starts to increase with the increasing of the voltage on the rectifying output terminal 2912. When the voltage on the control terminal of the voltage-limiting switch 410 is larger than a threshold voltage value, the channel of the voltage-limiting switch 410 is conducting, and forms a voltage-limiting current path including the current-limiting resistor 420. The voltage-limiting current path can be effective as a finite resistor and performing voltage dividing with the effective output resistor of the rectifier, which can effectively limit the increasing of the voltage on the rectifying output terminal 2912.

It is worth noting that the embodiment of the voltage limiter 391 disclosed in FIG. 3 is not limited to the embodiment disclosed in FIG. 4. The voltage limiter 400 disclosed in FIG. 4 is only for description purpose but not to limit the scope of our invention. People skilled in the art are capable of choosing proper circuit topologies in the prior for the voltage limiter 391 and further realizing them according to various applications.

Figure 5:
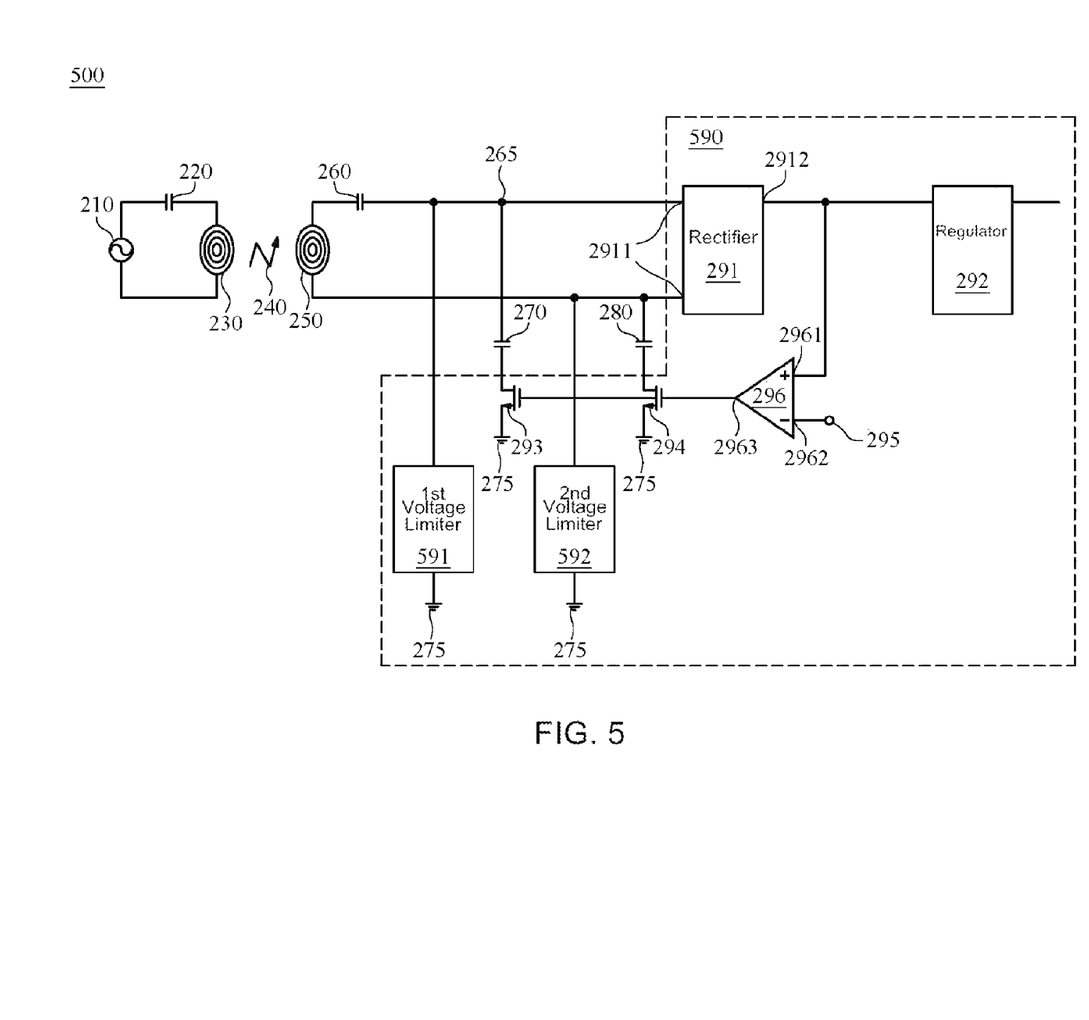
FIG. 5 is a schema showing a wireless power system of the third embodiment of the present invention.

FIG. 5 is a schema showing a wireless power system 500 of the third embodiment of the present invention. The function and the realization of each part of the wireless power system 500 can be referred to the description of the corresponding part of the wireless power system 200 disclosed in FIG. 2. The difference of the wireless power system 200 and 500 is that the power management unit 590 of the wireless power system 500 further includes a first voltage limiter 591 and a second voltage limiter 592. The first voltage limiter 591 includes a first voltage-limiting current path coupled between the power receiving terminal 265 and the ground terminal 275. When the voltage of the power receiving terminal 265 is larger than a first voltage threshold, the first voltage-limiting current path is conducting, and when the voltage of the power receiving terminal 275 is smaller than the first voltage threshold, the first voltage-limiting current path is cut-off. The second voltage limiter 592 includes a second voltage-limiting current path coupled between the other terminal of the second windings 250 and the ground terminal 275. When the voltage of the other terminal of the second windings 250 is larger than a second voltage threshold, the second voltage-limiting current path is conducting, and when the voltage of the other terminal of the second windings 250 is smaller than the second voltage threshold, the second voltage-limiting current path is cut-off.

Furthermore, the embodiment of the first voltage limiter 591 and the second voltage limiter 592 can be referred to the voltage limiter 400 disclosed in FIG. 4. It is worth noting that the embodiment of the first voltage limiter 591 or the second voltage limiter 592 is not limited to the embodiment disclosed in FIG. 4. The voltage limiter 400 disclosed in FIG. 4 is only for description purpose but not to limit the scope of our invention. People skilled in the art are capable of choosing proper circuit topologies in the prior for the first voltage limiter 591 or the second voltage limiter 592 and further realizing them according to various applications.

In more detail, by further including the first voltage limiter 591 or the second voltage limiter 592 in the power management unit 590 of the wireless power system 500, the voltage on each of the two terminals of the input port 2911 of the rectifier 291 is limited in the first place when each of the voltage on the two terminals of the input port 2911 is over-high, and the devices in the rectifier 291 are protected. However, each of the first voltage-limiting current path and the second voltage-limiting current path is effective as a finite resistor with limited current conducting ability, hence, the following protection, which is provided by the first switch 293, the second switch 294, the first protecting capacitor 270 and the second protecting capacitor 280, is activated by the response of the comparator 296 to further protect the power management unit 590, as is described in the first embodiment and the second embodiment of the invention.

According to the above descriptions, it can be understood that the protection circuit formed by the first voltage limiter 591, the second voltage limiter 592, the first switch 293, the second switch 294, the reference voltage terminal 295, the comparator 296, the first protecting capacitor 270 and the second protecting capacitor 280 in the wireless power system 500 can prevent the voltage on the input port 2911 from over-high, and further prevent the power management unit 590 from constantly receiving an over-high voltage causing the power management unit 590 to be with a short lifetime or even being damaged directly.

The aforementioned description only represents the preferred embodiment of this invention, without any intention to limit the scope of this invention thereto. Various equivalent changes, alterations, or modifications based on the claims of this invention are all consequently viewed as being embraced by the scope of this invention.

What is claimed is:

1. A power management unit, adapted to a wireless power system including second windings, an input capacitor, a first protecting capacitor and a second protecting capacitor, said input capacitor is coupled between one terminal of said second windings and a power receiving terminal, said second windings receiving a wireless power of alternating-current (AC), said power management unit comprising:

a rectifier, including an input port and a rectifying output terminal, wherein two terminals of said input port are coupled to said power receiving terminal and the other terminal of said second windings respectively, said rectifier converts an AC power received by said input port to a direct-current (DC) voltage, and said rectifying output terminal outputs said DC voltage;

a regulator, coupled to said rectifier and receiving said DC voltage to output a DC output voltage or to charge a battery;

a first switch, wherein said first protecting capacitor is coupled between said power receiving terminal and one terminal of a channel of said first switch, and the other terminal of the channel of said first switch is coupled to a ground terminal;

a second switch, wherein said second protecting capacitor is coupled between the other terminal of said second windings and one terminal of a channel of said second switch, and the other terminal of the channel of said second switch is coupled to said ground terminal;

a reference voltage terminal, providing a reference voltage;

a comparator, including two comparing input terminals and a comparing output terminal, wherein said two comparing input terminals are coupled to said rectifying output terminal and said reference voltage terminal respectively, and said comparing output terminal is coupled to both a control terminal of said first switch and a control terminal of said second switch; and a first voltage limiter, including a first voltage-limiting current path coupled between said power receiving terminal and said ground terminal, wherein when the voltage of said power receiving terminal is larger than a first voltage threshold, said first voltage-limiting current path is conducting, and when the voltage of said power receiving terminal is smaller than said first voltage threshold, said first voltage-limiting current path is cut-off; and a second voltage limiter, including a second voltage-limiting current path coupled between the other terminal of said second windings and said ground terminal, wherein when the voltage of the other terminal of said second windings is larger than a second voltage threshold, said second voltage-limiting current path is conducting, and when the voltage of the other terminal of said second windings is smaller than said second voltage threshold, said second voltage-limiting current path is cut-off.

2. The power management unit of claim 1, wherein said first voltage limiter or said second voltage limiter further comprises:

a voltage-limiting switch, one terminal of a channel of said voltage-limiting switch coupled to said ground terminal;

a current-limiting resistor, coupled between another terminal of the channel of said voltage-limiting switch and either said power receiving terminal or the other terminal of said second windings;

a diode serial-connecting circuit, formed by serially connecting a plurality of diodes and coupled between a control terminal of said voltage-limiting switch and either said power receiving terminal or the other terminal of said second windings; and a control-terminal resistor, coupled between the control terminal of said voltage-limiting switch and said ground terminal.

3. The power management unit of claim 2, wherein said first switch and said second switch are N-type field-effect transistors (FET's) or NPN-type bipolar junction transistors (BJT's).

4. The power management unit of claim 2, wherein said power management unit is an integrated circuit manufactured by a semiconductor process.

5. The power management unit of claim 2, wherein said first protecting capacitor and said second protecting capacitor are electrolytic capacitors or ceramic capacitors.

6. A wireless power system, comprising:

second windings, receiving a wireless power of alternating-current (AC);

an input capacitor, coupled between one terminal of said second windings and a power receiving terminal;

a first protecting capacitor;

a second protecting capacitor;

a power management unit, comprising:

a rectifier, including an input port and a rectifying output terminal, wherein two terminals of said input port are coupled to said power receiving terminal and the other terminal of said second windings respectively, said rectifier converts an AC power received by said input port to a direct-current (DC) voltage, and said rectifying output terminal outputs said DC voltage;

a regulator, coupled to said rectifier and receiving said DC voltage to output a DC output voltage or to charge a battery;

a first switch, wherein said first protecting capacitor is coupled between said power receiving terminal and one terminal of a channel of said first switch, and the other terminal of the channel of said first switch is coupled to a ground terminal;

a second switch, wherein said second protecting capacitor is coupled between the other terminal of said second windings and one terminal of a channel of said second switch, and the other terminal of the channel of said second switch is coupled to said ground terminal;

a reference voltage terminal, providing a reference voltage; and a comparator, including two comparing input terminals and a comparing output terminal, wherein said two comparing input terminals are coupled to said rectifying output terminal and said reference voltage terminal respectively, and said comparing output terminal is coupled to both a control terminal of said first switch and a control terminal of said second switch;

a first voltage limiter, including a first voltage-limiting current path coupled between said power receiving terminal and said ground terminal, wherein when the voltage of said power receiving terminal is larger than a first voltage threshold, said first voltage-limiting current path is conducting, and when the voltage of said power receiving terminal is smaller than said first voltage threshold, said first voltage-limiting current path is cut-off; and a second voltage limiter, including a second voltage-limiting current path coupled between the other terminal of said second windings and said ground terminal, wherein when the voltage of the other terminal of said second windings is larger than a second voltage threshold, said second voltage-limiting current path is conducting, and when the voltage of the other terminal of said second windings is smaller than said second voltage threshold, said second voltage-limiting current path is cut-off.

7. The wireless power system of claim 6, wherein said first voltage limiter or said second voltage limiter further comprises:

a voltage-limiting switch, one terminal of a channel of said voltage-limiting switch coupled to said ground terminal;

a current-limiting resistor, coupled between another terminal of the channel of said voltage-limiting switch and either said power receiving terminal or the other terminal of said second windings;

a diode serial-connecting circuit, formed by serially connecting a plurality of diodes and coupled between a control terminal of said voltage-limiting switch and either said power receiving terminal or the other terminal of said second windings; and a control-terminal resistor, coupled between the control terminal of said voltage-limiting switch and said ground terminal.

8. The wireless power system of claim 7, wherein said first switch and said second switch are N-type field-effect transistors (FET's) or NPN-type bipolar junction transistors (BJT's).

9. The wireless power system of claim 7, wherein said power management unit is an integrated circuit manufactured by a semiconductor process.

10. The wireless power system of claim 7, wherein said first protecting capacitor and said second protecting capacitor are electrolytic capacitors or ceramic capacitors.

* * * * *